US011910823B1

(12) United States Patent
Shepelev

(10) Patent No.: US 11,910,823 B1
(45) Date of Patent: Feb. 27, 2024

(54) ELECTRIC HEATING APPARATUS AND METHOD FOR A SMOKING DEVICE

(71) Applicant: Dmitrii Shepelev, Brest (BY)

(72) Inventor: Dmitrii Shepelev, Brest (BY)

( * ) Notice: Subject to any disclaimer, the term of this patent is extended or adjusted under 35 U.S.C. 154(b) by 382 days.

(21) Appl. No.: 16/291,421

(22) Filed: Mar. 4, 2019

(51) Int. Cl.
*A24F 1/30* (2006.01)
*H05B 6/06* (2006.01)

(52) U.S. Cl.
CPC ................ *A24F 1/30* (2013.01); *H05B 6/06* (2013.01)

(58) Field of Classification Search
None
See application file for complete search history.

(56) References Cited

U.S. PATENT DOCUMENTS

2016/0120225 A1* 5/2016 Mishra .................... A24F 40/42 392/386

OTHER PUBLICATIONS

Definition of longitudinal, Merriam-Webster Dictionary, [online], retrieved from the Internet, retrieved Apr. 17, 2021, <URL: https://www.merriam-webster.com/dictionary/longitudinal>. (Year: 2021).*

* cited by examiner

*Primary Examiner* — Dennis R Cordray
(74) *Attorney, Agent, or Firm* — Intellectual Property Consulting, LLC; Mark N. Melasky

(57) ABSTRACT

A smoking device comprising a longitudinal shell with a first cavity. A channel in said first cavity has a longitudinal shape and a peripheral wall, a top, a bottom defining a second cavity. The top and bottom of the channel are substantially open. Said first cavity comprises a compound member with an electrically conductive winding. The open top of the channel meets the outer surface of the shell, and the shell has an opening in its outer surface corresponding to the open top of the channel, thereby allowing ambient air to flow into said second cavity. When electrical current flows through the winding, the compound member generates heat and heats air flowing through said second cavity. Air flows through longitudinal holes inside the compound member, through grooves in the exterior of the compound member, air and passes through and heats the smoking material.

20 Claims, 8 Drawing Sheets

ELECTRIC HEATING APPARATUS AND METHOD FOR A SMOKING DEVICE

FIELD OF INVENTION

This invention concerns devices for smoking and, more specifically, a heating apparatus for a hookah.

BACKGROUND

Smoking devices are historically well known across the world. Typically, a smoking material is heated and combusted in the smoking device, and a user inhales the emanating smoke and aromas, usually through a hose or a pipe. The smoking material usually comprises tobacco, but may comprise other material, such as marijuana, etc. Sometimes the smoking material is combined with other materials for an enhanced smoking experience, such as tobacco mixed with glycerine, honey, and flavor enhancers. During a typical smoking process all these materials combust simultaneously, whereby the user experiences a combination of the resulting smoke and aromas. During such process these materials are oxidized to a significant extent.

Smoking devices for engaging in a smoking experience vary. Many devices, such as hookahs, include a predetermined pathway through which ambient air is drawn in and travels through when the user inhales, before the air is inhaled by the user. This pathway includes passing through the combusting smoking material and water. Water is provided to serve certain purposes, such as to serve as a filter for the air passing through it, to filter out some of the undesirable materials emitted into the air during the oxidation process earlier.

Combustion in a smoking device, such as a hookah, is a high-temperature exothermic reaction wherein the smoking material is substantially oxidized. This process produces several byproducts. Further, the combustion process typically involves a carbon-based burning material, such as coal, which burns to produce heat. The heat produced by the combusting coal is usually hot enough to combust the smoking material. Burning the smoking material produces harmful chemicals and byproducts that may carry carcinogenic properties when inhaled. These include nitrosamines, polycyclic aromatic hydrocarbons (PAHs, e.g. anthracene and benzopyrene), volatile aldehydes (e.g. formaldehyde, acetaldehyde, acrolein, etc.), benzene, and heavy metals such as arsenic, chromium, lead, and the like. Additionally, harmful gases such as carbon dioxide and carbon monoxide from the combusting coal join the dangerous mix inhaled by the user. A user inhaling such contaminated smoke subjects himself to dangerous health hazards. These undesirable contaminants also adversely impact the taste of the smoke inhaled by the user, by adding a bitter or unpleasant taste to the air inhaled by the user.

Passing such contaminated air through water in a hookah does not filter out all the contaminants as water is not a reliable filter. Although water may filter out some contaminants, a dangerous level of contaminants still pass through.

Combusting coal (or other combustion material) in a smoking device presents a dangerous fire hazard as well. The user may accidentally come in contact with the high-temperature combusting materials and cause burns. Or the combusting material may spill or get knocked out of the smoking device and ignite a fire.

It would be preferable for the user to be able to enjoy the experience of smoking the smoking material without combusting the smoking material in order to avoid the health hazards associated with the combustion process. It would be further preferable to eliminate the need for combusting coal or alternate combustion materials during the smoking process in order to avoid the health hazards as well as other dangers associated with that material's combustion.

Some smoking devices offer the option of heating the smoking material with electrical heat in an effort to circumvent the combustion process. However, these devices tend to overheat the smoking material or inadequately heat it. As a result, some additives to the smoking material, such as honey or molasses, emit a bitter taste and adversely impact the user's smoking experience. In other instances the user is not able to achieve a good smoking experience if the temperature of the smoking material is not high enough. It is preferable to provide a desirable heating temperature to the smoking material for the user to achieve a pleasant smoking experience.

Smoking devices offering the option of electrical heating often times provide apparatus that is functional but is not aesthetically appealing. It is preferable to provide a smoking device that is functional as well as aesthetically appealing for a consumer.

SUMMARY OF THE INVENTION

An oviform (or ovoid) shaped shell is provided for a smoking device, such as a hookah. The oviform shell comprises an upper shell portion and a lower shell portion, both of which can cooperatively engage with each other to complete a unitary ovoid shape for the shell. The outer surfaces of the upper shell portion and the lower shell portion each define internal cavities, which cavities each comprise apparatus for facilitating smoking of smoking material through the smoking device.

In one embodiment, a plurality of channels run vertically through the upper shell portion. Each channel is cylindrical in shape, hollow, and open at each end. The opening at the top end of each channel corresponds to an opening in the surface of the oviform shell towards the top of the upper shell portion. These corresponding openings at the top of each channel and at the the top of the upper shell portion allow ambient air to flow into the oviform shell via the hollow body of the channel.

Each channel has an elongated cylindrical body, and the cylindrical walls are preferably constructed of ceramic material. In alternate embodiments, they may be constructed of a metallic or a heat resistant material. The bottom of each channel opens into the cavities inside the upper shell portion and the lower shell portion of the oviform shell, which cavities hold one or more portions of smoking material. Ambient air entering each channel from the top passes through the channels, exits into the cavities, and passes through the smoking material, before exiting through the bottom of the lower shell portion. This airflow may then pass through a set of tubing, water, a hose, or the like, to be inhaled by a user for a smoking experience.

Airflow through this path is achieved by the user inhaling air from a hose or a tube at the end of the airflow path in the smoking device. This draw of air by the user creates a lower pressure inside the oviform shell, which results in ambient air being drawn into the oviform shell via the channels, through the opening at the top of each channel.

The hollow body of each channel has a wall that includes a compound member constructed of a predetermined material. In one embodiment, the compound member is constructed of graphite. The compound member conforms substantially closely to the wall of the channel. The compound member includes one or more longitudinal holes that pass entirely through the compound member, whereby air may flow through the compound member via the one or more longitudinal holes.

The compound member has striations, or grooves, on its exterior that permit airflow between the compound member and the wall of the channel from a top end of the compound member to a bottom end of the compound member.

An electrically conductive winding is wrapped around the compound member on the exterior of the channel An electric current passed through the winding produces an electromagnetic field, which causes the compound member to generate heat. In one embodiment, an electric current at a frequency of 60 KHz is passed through the electrically conductive winding, which causes the compound member to generate heat.

The heat from the compound member heats the ambient air passing through the channel, through the compound member, via the longitudinal holes and via the grooves on the exterior of the compound member. This heated air exits the channel at the bottom of the channel.

The heated air exiting the bottom of the channel enters a mixing chamber located in the cavity in the upper shell portion. The heated air is mixed with cooler ambient air in the mixing chamber, which cooler air enters through a plurality of apertures in the upper shell portion. This cooler ambient air is drawn in through the apertures by the same low pressure inside the oviform shell that draws in air through the channels.

Some of the apertures in the upper shell portion are selectively adjustable, whereby the user can increase or decrease the size of their orifices within a predetermined range. The larger the orifices of these adjustable apertures, the greater the amount of cooler ambient air will be drawn into the mixing chamber through them, and vice versa.

Mixing the hot air from the channels with cooler ambient air in the mixing chamber produces a more desirable net temperature for the air. The user may adjust this desirable net temperature for the air by adjusting the size of the orifices of the adjustable apertures in the upper shell portion.

The mixed heated air exits the mixing chamber and passes through one or more portions of smoking material located in the lower shell portion. The mixed heated air thereby heats the smoking material as it passes through the smoking material. At a desirable temperature for the mixed heated air, the smoking material reaches a desirable temperature due to this mixed heated air passing through it. This heating of the smoking material causes it to emanate its flavors and aromas into the passing air. This flavored and aromatic air flows through the remaining airflow path of the smoking device, such as through water and a hose, to be inhaled by the user.

The temperature of the smoking material can be regulated by the temperature of the mixed heated air that passes through it. The temperature of the mixed heated air can be regulated by the frequency and amount of electrical current passed through the electrically conductive windings that cause the compound members to heat the ambient air as it passes through the channels.

Electrical current to the electrically conductive windings is delivered via two electrical leads that form an electrical connection with an electric power source via apparatus inside the oviform shell. In one embodiment, a pin mechanism in the upper shell portion pushes two separate electrical contacts against springs when the upper shell portion is cooperatively engaged with the lower shell portion. The springs push the electrical contacts into contact with corresponding metallic surfaces on the pin mechanism. This results in an electrical connection for the two metallic surfaces on the pin mechanism with an electric power source. Electrical conducting leads connect the two metallic surfaces on the pin mechanism to the electrically conductive windings. The frequency of, and the amount of, electrical current or electric power delivered to the electrically conductive windings can be regulated by controlling the amount of power delivered from the electrical power source.

BRIEF DESCRIPTION OF THE FIGURES

The invention can be better understood with reference to the drawings and description provided herein. In the figures, like reference numerals designate corresponding parts throughout the different figures and views.

DETAILED DESCRIPTION

The systems, methods and apparatus of the present invention are described with reference to the figures. The description and figures are for illustrative purposes only, they do not limit the true scope and spirit of the present invention.

Figure 1:
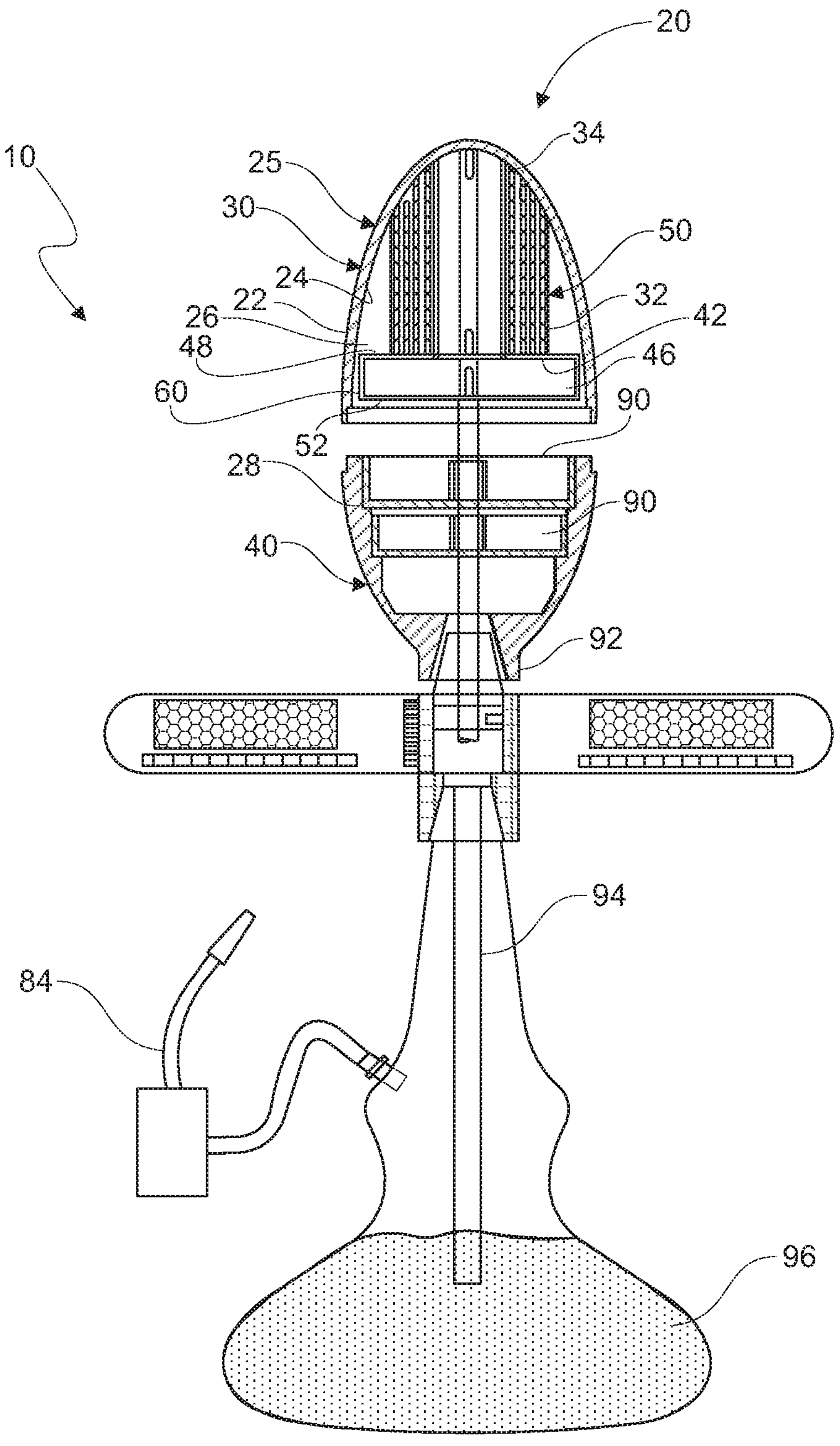
FIG. 1 is a partial view of an electronic hookah device comprising an oviform shell according to one embodiment of the present invention.

In one embodiment of the present invention, a smoking device is provided in the form of a hookah 10. Hookah 10 comprises an oviform shell 20. Oviform shell 20 comprises an upper shell portion 30 and a lower shell portion 40. FIG. 1 shows a partial view of hookah 10 comprising oviform shell 20 with upper shell portion 30 and lower shell portion 40.

Oviform shell 20 has an exterior surface 22 and an interior surface 24. In the embodiment shown in FIG. 1, exterior surface 22 of oviform shell 20 is shaped substantially in the form of an ovoid. It is anticipated that oviform shell 20 may have a different shape in alternate embodiments while still achieving the features and benefits of the present invention and without departing from the spirit and scope of the present invention.

The exterior surface 22 and interior surface 24 of oviform shell 20 form a continuous outer shell 25 that defines a cavity inside oviform shell 20. The thickness of the outer shell of oviform shell 20 may vary, usually depending on the material that it is constructed of. In one embodiment outer shell 25 of oviform shell 20 is made of a ceramic material. In alternate embodiments outer shell 25 of oviform shell 20 is made of a metallic material or a heat resistant material suitable for withstanding higher temperatures. It is anticipated that outer shell 25 of oviform shell 20 may be constructed of any material known in the art appropriate for such apparatus in a smoking device.

Oviform shell 20 is separable into upper shell portion 30 and lower shell portion 40 horizontally along its ovoid-shaped body. The design and location of the separation between upper shell portion 30 and lower shell portion 40 may vary from one embodiment to another. Upper shell portion 30 and lower shell portion 40 cooperatively engage with each other to form a uniform ovoid shape for oviform shell 20, or they can cooperatively disengage to form the two separate shell portions. One skilled in the art will recognize that the two shell portions can be designed to cooperatively engage and disengage in a number of ways. In one embodiment, the two shell portions engage and disengage by virtue of corresponding threads that allow one shell portion to be twisted with respect to the other with the corresponding threads cooperatively engaging or disengaging with each other.

Outer shell 25 has an exterior surface 22 and an interior surface 24. Outer shell 25 defines a cavity inside. Upper shell portion 30 has a cavity 26, while lower shell portion 40 has a cavity 28.

Both shell portions comprise apparatus designed to assist with the performance of the smoking device. Upper shell portion 30 includes one or more channels 50 that run vertically, or lengthwise, through upper shell portion 30. In one embodiment, upper shell portion 30 comprises three channels 50. However, it is anticipated that other embodiments may include more or fewer channels 50 without departing from the spirit and scope of the present invention.

In one embodiment, each channel 50 has a substantially cylindrical shape, with a cylindrical wall 32 having a round cross-section. In alternate embodiments, it is anticipated that each channel 50 may have a cylindrical wall with a different shaped cross-section, such as a wall with an elliptical cross-section, an oval cross-section, a rectangular or square cross-section, a star-shaped cross-section, and the like. All such shapes and embodiments fall within the spirit and scope of the present invention.

In one embodiment, cylindrical wall 32 has a diameter of approximately one inch. The cylindrical wall 32 of each channel 50 is constructed of a ceramic material in one embodiment. The cylindrical body of each channel 50, inside the cylindrical wall 32, is substantially hollow, thereby defining a cavity 38 running lengthwise through the respective channel 50. Each channel 50 meets the shell of upper shell portion 30 at its upper end 34.

Figure 2:
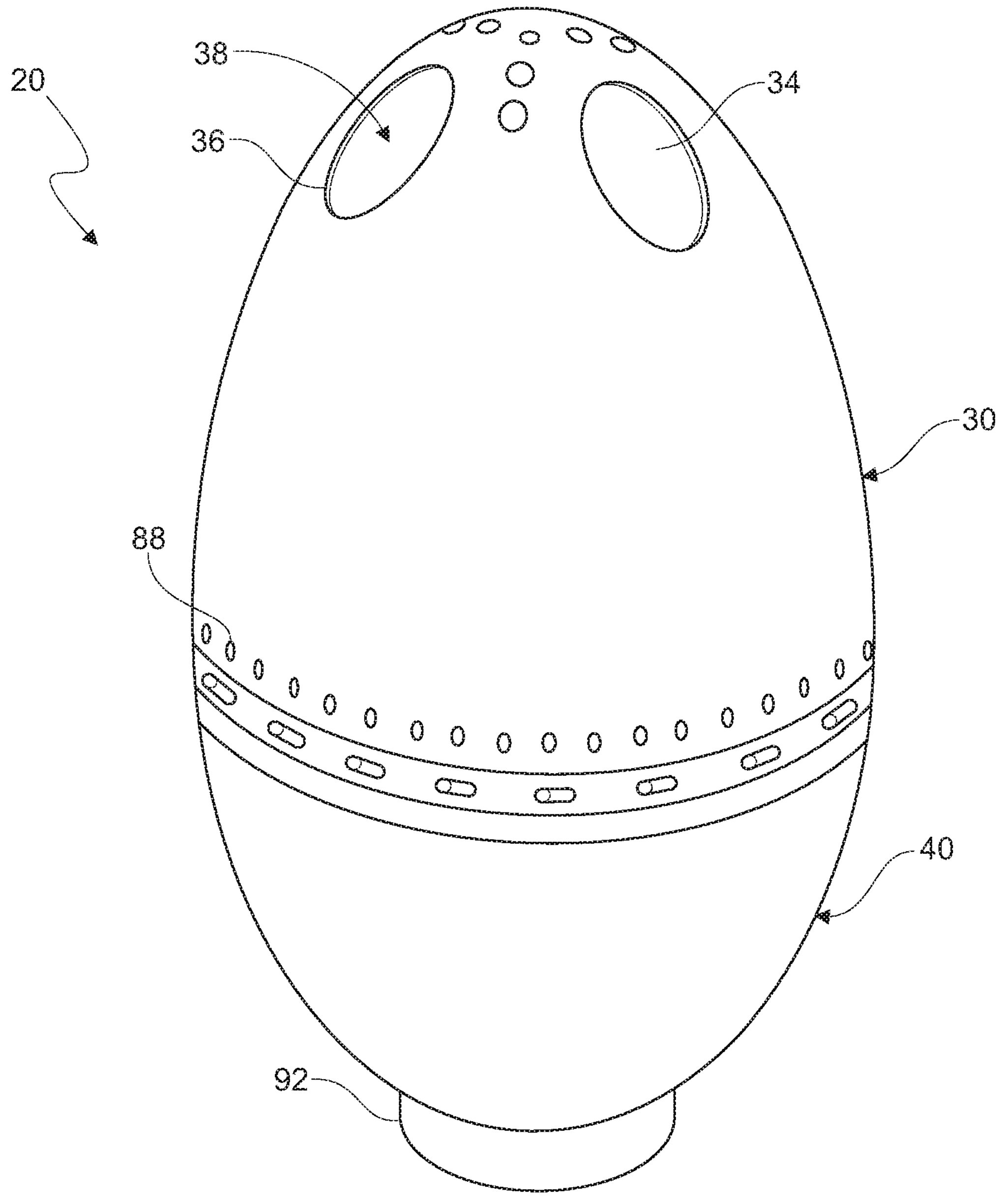
FIG. 2 is a perspective view of the exterior of an oviform shell in the hookah device of FIG. 1.

Both ends of each channel's 50 cylindrical body are open. At its upper end 34, each channel 50 meets a corresponding opening in the outer shell of upper shell portion 30. Referring to FIG. 2, a perspective view of the exterior of oviform shell 20 is shown. Upper shell portion 30 has one or more openings 36 towards the top, one opening 36 corresponding to each channel 50, each of which is flush with the opening at the upper end 34 of a corresponding channel 50. These corresponding openings in the channel 50 and upper shell portion 30 expose the cavity 38 inside the corresponding channel 50 to ambient air outside the smoking device, or hookah 10.

At the other end of each channel 50, the channel 50 has an opening 42. Each opening 42 of each channel 50 meets a camera, or chamber, 60 which is located in cavity 26 in upper shell portion 30. Camera 60 has a cylindrical shape in one embodiment, with a short height and a substantially hollow interior that forms a cavity 46.

Figure 7:
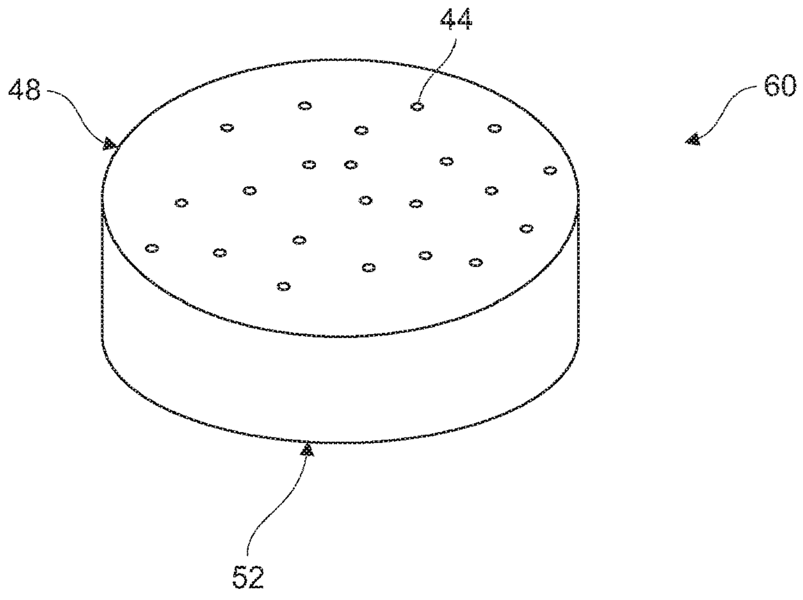
FIG. 7 is a perspective view of a camera associated with an upper shell portion of the oviform shell of FIG. 2.

FIG. 7 shows a perspective view of camera 60. Camera 60 has a top 48 and a bottom 52. Top 48 and bottom 52 of camera 60 are closed, thereby enclosing cavity 46. Top 48 and bottom 52 of camera 60 have openings 44 that allow airflow between cavity 46 and the exterior of camera 60. In one embodiment, openings 44 are perforations in top 48 and bottom 52 of camera 60.

Although channels 50 in the embodiment shown and described are identical, and cylindrical in shape, those skilled in the art will recognize that channels may vary in shape and design from the cylindrical shape and design depicted in the figures. For example, channels 50 may have a different cross section in an alternate embodiment. Further, channels 50 may differ from in shape and/or design from each other and do not need to be identical in a particular smoking device. Additionally, various embodiments may have a different number of channels, which may depend on the particular specifications and requirements of that particular smoking device. Accordingly, channels 50 may vary in alternate embodiments without departing from the spirit and scope of the present invention, provided that the channels have a cavity allowing airflow through them. All such embodiments are, therefore, anticipated.

Figure 3:
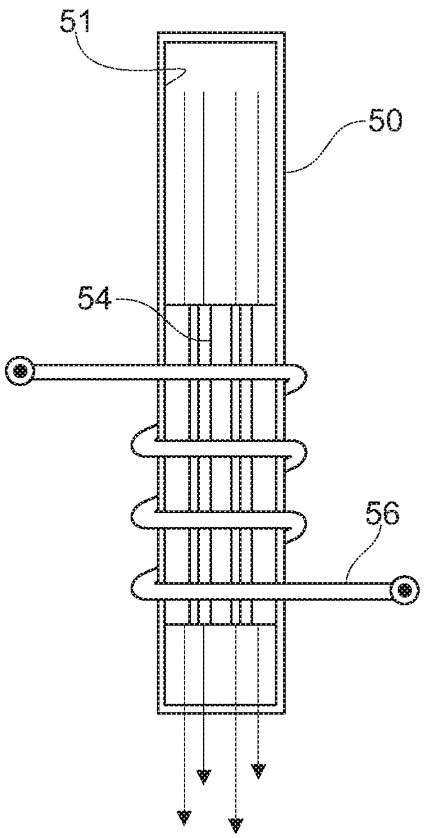
FIG. 3 is a partial side view of a channel inside the oviform shell of FIG. 2.

FIG. 3 shows a partial side view of a channel 50 inside oviform shell 20. Cavity 38 in each channel 50 includes a compound member 54. Compound member 54 is constructed of a predetermined material that generates heat in the presence of an electromagnetic field, or acts as an induction heater. In one embodiment, compound member 54 is constructed of graphite.

Figure 4:
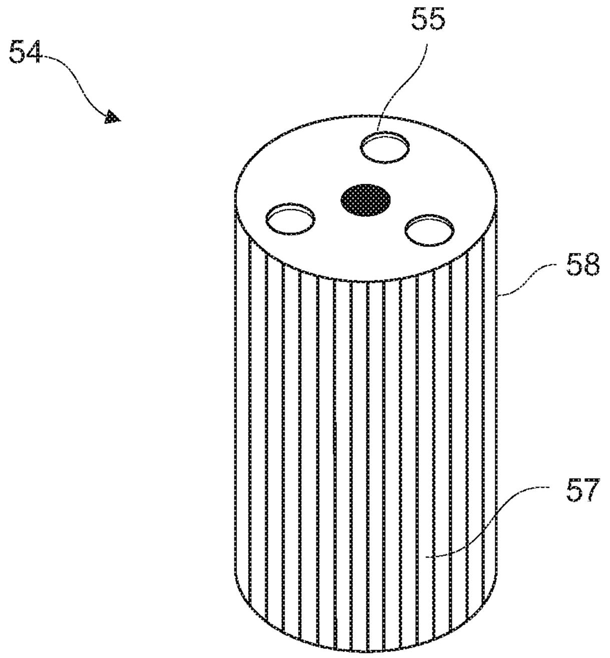
FIG. 4 is a perspective view of one embodiment of a compound member for a channel of FIG. 3.

An exterior surface 58 of compound member 54 is preferably designed to substantially conform to a wall 51 of channel 50. FIG. 4 shows a perspective view of one embodiment of compound member 54. Compound member 54 in this embodiment has a cylindrical shape, which is because channel 50 has a cylindrical shape.

Compound member 54 has one or more longitudinal holes 55 that pass through compound member 54. Each longitudinal hole 55 is hollow, and runs all the way through compound member 54, whereby air may flow through it unobstructed.

Compound member 54 has one or more striations, or grooves, 57 that run across its exterior body from its top to its bottom. Grooves 57 are small hollow indentations in the body of compound member 54 that allow a small amount of air to flow through them. Such small airflow would occur in the small space created by each groove 57 between compound member 54 and wall 51 of channel 50.

Figure 6:
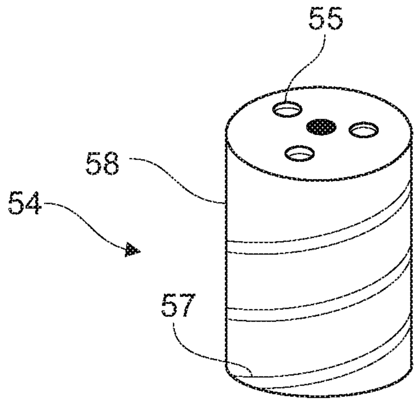
FIG. 6 is a perspective view of another embodiment of a compound member for a channel of FIG. 3.

In one embodiment, grooves 57 are substantially straight lines as shown in FIG. 4 that run straight from the top of compound member 54 to bottom of compound member 54. In an alternate embodiment, grooves 57 are circular grooves that run circularly around the periphery of compound member 54 as shown in FIG. 6. These grooves 57 create a small path for airflow between compound member 54 and wall 51 of channel 50 similar to the grooves 57 in the embodiment shown in FIG. 4, except that the airflow takes a circuitous path in this embodiment instead of a straight vertical path in the embodiment shown in FIG. 4. Accordingly, grooves 57 for an airflow path on the exterior of compound member can be implemented in a number of ways, and all such embodiments are anticipated.

An electrically conductive winding 56 is wrapped around compound member 54 as shown in FIG. 3. Winding 56 may be constructed of any electrically conductive material known in the art that is used for conducting electricity, and is a copper wire in one embodiment. Winding 56 is wrapped around compound member 54 on the exterior of channel 50 in the embodiment shown in FIG. 3.

Electrically conductive winding 56 is connected to an electrical power source, which allows electrical current to flow through winding 56. When an electrical current is passed through electrically conductive winding 56, an electromagnetic field is produced by winding 56. The presence of an electromagnetic field causes compound member 54 to produce heat. Accordingly, heat is produced inside channel 50 by compound member 54 when an electric current is passed through winding 56.

Figure 8:
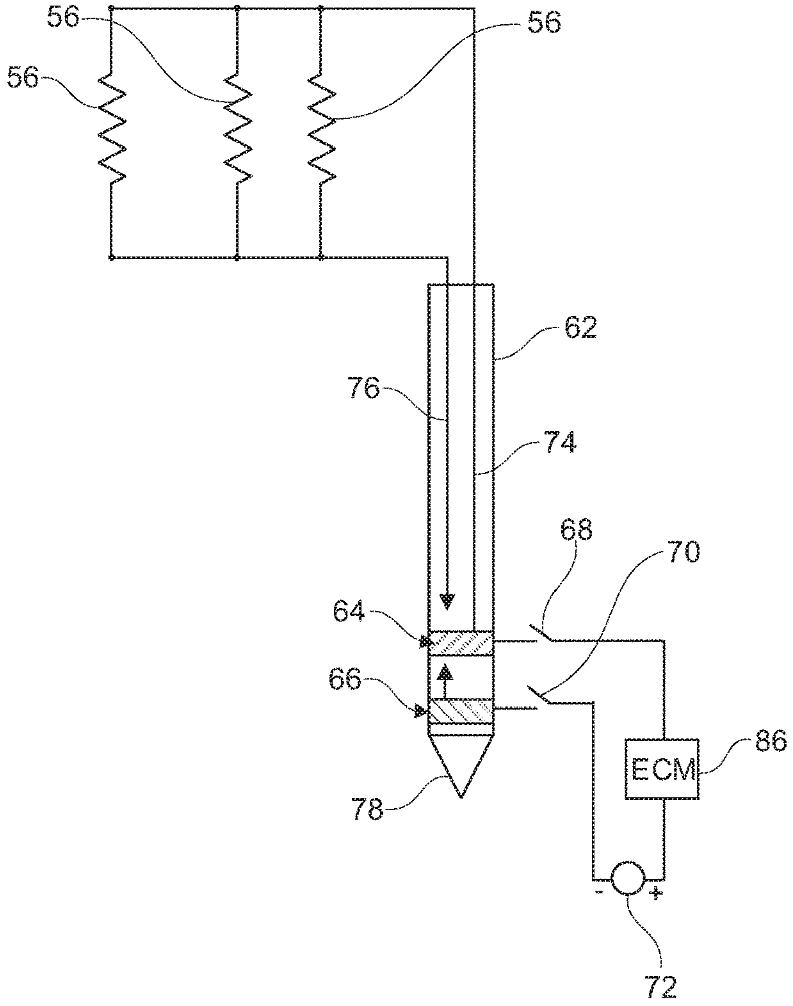
FIG. 8 is a schematic view of electrical connections to some of the apparatus associated with an upper shell portion of the oviform shell of FIG. 2.

FIG. 8 shows a schematic diagram of one embodiment of the electrical connections for electrical current to flow through windings 56. A pin stem 62 has two electrically conducting surfaces, a positive conducting surface 64 and a negative conducting surface 66. Pin stem 62 is associated with upper shell portion 30. When upper shell portion 30 is cooperatively engaged with lower shell portion 40, positive conducting surface 64 on pin stem 62 comes into physical contact with a positive contact mechanism 68, and, at the same time, negative conducting surface 66 on pin stem 62 comes into physical contact with a negative contact mechanism 70. This physical contact permits electrical current to flow between them, whereby any electrical current flowing from the contact mechanisms will be delivered to the conducting surfaces on pin stem 62.

Positive contact mechanism 68 and negative contact mechanism 70 are connected to the positive and negative terminals, respectively, of an electric power source 72. Electric power source 72 is selectively able to deliver electric power to the positive conducting surface 64 and the negative conducting surface 66 via positive contact mechanism 68 and negative contact mechanism 70, respectively.

Electric power source 72 is an AC power source in one embodiment that supplies electricity at 60 KHz. However, it is anticipated that electric power source 72 may be any device known in the art capable of delivering electrical power, such as a rechargeable battery, a solar cell, or the like.

Positive conducting surface 64 and negative conducting surface 66 are electrically connected to windings 56 in each channel 50, such as via electrical leads 74 and 76. Accordingly, electric power source 72 can deliver electric power to windings 56 in each channel 50.

One skilled in the art will recognize that the amount of electrical power delivered to the various windings 56 may be varied between the channels 50 in alternate embodiments of the present invention by implementing a mechanism, such as a resistor or a control module, in the electrical leads connecting leads 74 and 76 to each electrically conductive winding 56. Such variations may help accomplish desired variations or heating patterns in heating smoking material in the smoking device, or hookah 10. Accordingly, all such variations are anticipated and are intended to be covered by the present claims.

Figure 9:
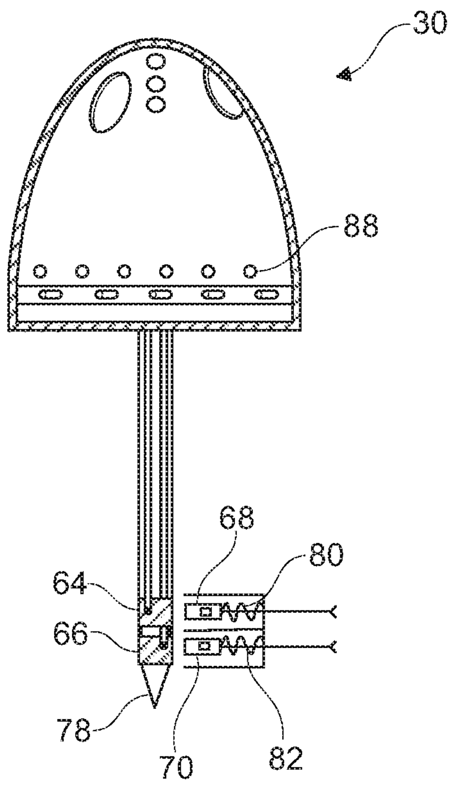
FIG. 9 is a side view of some apparatus associated with an upper shell portion of the oviform shell of FIG. 2.

FIG. 9 is a side view of upper shell portion 30 of oviform shell 20. Pin stem 62 is positioned at substantially the center of upper shell portion 30, extending vertically downwards. Pin stem 62 has a conical end 78. When upper shell portion 30 commences cooperatively engaging with lower shell portion 40, conical end 78 comes in contact with positive contact mechanism 68 and negative contact mechanism 70. The angular shape of conical end 78 of pin stem 62 exerts a sideways force against positive contact mechanism 68 and negative contact mechanism 70. This sideways force is countered by a force exerted in the opposite direction by a spring 80 positioned behind positive contact mechanism 68, and by a spring 82 positioned behind negative contact mechanism 70. As upper shell portion 30 completes cooperatively engaging with lower shell portion 40, pin stem 78 completes extending downwards into lower shell portion 40, and positive contact mechanism 68 comes to rest against positive conducting surface 64 on pin stem 62 while being pushed by spring 80. Similarly, negative contact mechanism 70 comes to rest against negative conducting surface 66 on pin stem 62 while being pushed by spring 82. The force from springs 80 and 82 helps create better physical contact between the two contact mechanisms and their respective conducting surfaces on pin stem 62.

In one embodiment, positive contact mechanism 68 and negative contact mechanism 70 are graphite brushes. In alternate embodiments, it is anticipated that the contact mechanisms may comprise an alternate apparatus capable of conducting electricity.

In the smoking device, or hookah 10, a user will typically draw in air by inhaling from a hose or a tube 84. This creates a low air pressure inside smoking device 10. As a result, ambient air is drawn into the smoking device via the plurality of openings 36 at the top of upper shell portion 30. Ambient air is drawn into cavities 38 of channels 50 via open upper end 34 of each channel 50.

Figure 5:
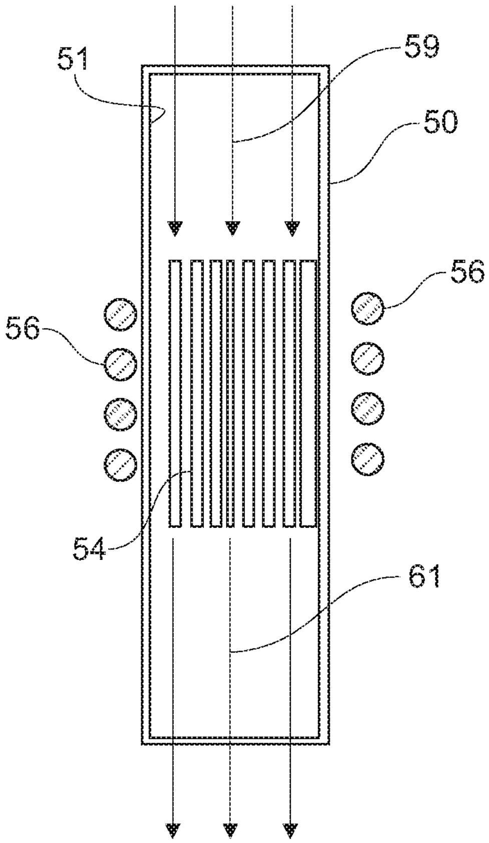
FIG. 5 is a partial view of the channel of FIG. 3.

As ambient air passes through cavity 38, it travels through channel 50, wherein its path is obstructed by compound member 54. FIG. 5 shows a partial view of channel 50 with ambient air flowing into channel 50 from the top depicted by arrows 59. This airflow is obstructed by compound member 54. However, ambient air 59 can flow through longitudinal holes 55 in compound member 54. Some ambient air 59 also flows through grooves 57 on the exterior of compound member 54. Ambient air that passes compound member 54 exits the bottom of compound member 54 in channel and is depicted by arrows 61 in FIG. 5.

Ambient air 59 is exposed to compound member 54 in longitudinal holes and in grooves 57 before it exits from the bottom of compound member 54 in channel 50, as depicted by arrows 61. If an electric current is passed through winding 56, which is wound around compound member 54, compound member generates heat. Ambient air 59 passing compound member 54 is heated as a result, and achieves a higher temperature when it exits at the bottom of compound member 54 in channel Accordingly, the temperature of compound member 54, and therefore the temperature of the air 61 exiting at the bottom of compound member 54 in channel 50, can be controlled by controlling the frequency and amount of electric current that is passed through winding 56.

In one embodiment, a control mechanism 86 in the electrical circuit supplying electrical power to positive contact mechanism 68 and negative contact mechanism 70 helps regulate the frequency and amount of electrical current that is passed through winding 56. Control mechanism 86 may be an electrical control module in one embodiment. In one embodiment, the frequency of the electric current that is passed through winding 56 is 60 KHz.

Ambient air 59 that passes through longitudinal holes 55 is heated differently by the heat generated by compound member 54 as compared to ambient air 59 that passes through grooves 57. One skilled in the art will recognize that typically, ambient air 59 that passes through longitudinal holes 55 will be heated more, and will be at a comparatively higher temperature when it exits compound member 54, as compared to ambient air 59 that passes through grooves 57 located on the exterior of compound member 54. Both these volumes of ambient air 59, one that passes through longitudinal holes 55 and one that passes through grooves 57, exit compound member 54 at the bottom and mix together. Their temperatures blend together. The resulting temperature of air 61 is therefore lower than the temperature of the air exiting longitudinal holes 55, and it is higher than the temperature of the air exiting grooves 57. This resulting blended temperature is preferable as it is not too hot and not too cold for achieving a good smoking experience. In this regard, the length and design of grooves 57, the number of grooves 57, the size of grooves 57, the number of longitudinal holes the size of longitudinal holes 55, and the like, can each be modified independently to achieve a desired temperature for air 61 exiting compound member 54 at the bottom in channel 50, and will therefore vary from one embodiment to another depending on the specifications and requirements of the respective embodiment. All such embodiments and modifications are anticipated.

After air 61 reaches a desired temperature in cavity 38, the it exits channel 50 at its opening 42 at the lower end of channel 50. This heated air enters camera 60 via openings 44. Additionally, ambient air at room temperature is drawn into cavity 26 of upper shell portion 30 via a series of apertures 88 in the outer shell of oviform shell 20. Specifically, apertures 88 are formed in upper shell portion 30 as shown in FIG. 2. This room temperature air also enters camera 60 via openings 44 along with the heated air from channels 50. The heated air and room temperature air mix in camera 60, resulting in a mixed temperature air that is an ideal temperature for heating smoking material in the smoking device, or in hookah 10.

Figure 10:
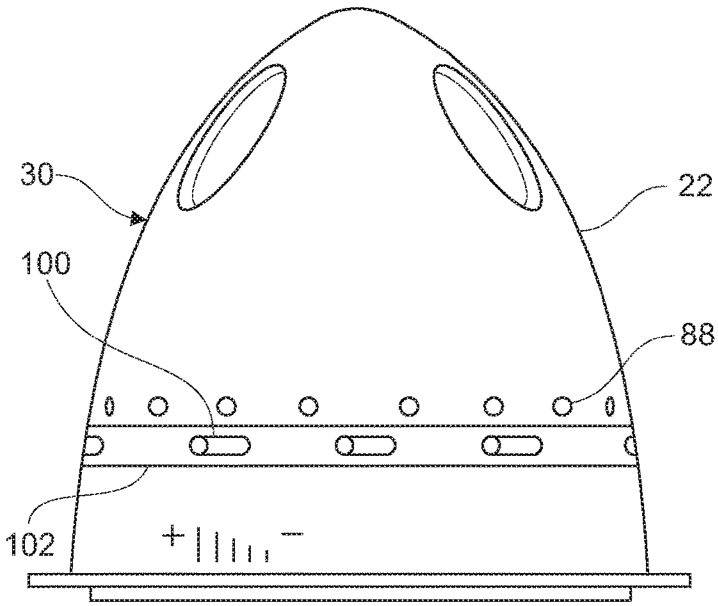
FIG. 10 is a a side view of the upper shell portion of FIG. 2.

In one embodiment, upper shell portion 30 includes a second series of apertures that are adjustable. FIG. 10 shows a side view of upper shell portion 30 with apertures 88 and adjustable apertures 100. Adjustable apertures 100 have an elongated shape in one embodiment, and are spaced apart from each other by at least the length of each adjustable aperture 100. A ring 102 is implemented on exterior surface 22 of upper shell portion 30 atop adjustable apertures 100. Ring 102 is circular, with a circumference corresponding to a circumference of exterior surface 22 at the location where ring 102 is implemented on upper shell portion 30. Ring 102 includes apertures corresponding in shape and size to adjustable apertures 100. Ring 102 is rotatable with respect to upper shell portion 30.

One skilled in the art will recognize that the size of an orifice created by each adjustable aperture 100 can be adjusted by rotating ring 102 with respect to upper shell portion 30. A user may selectively rotate ring 102 with respect to upper shell portion 30 to adjust the size of the orifices of adjustable apertures 100.

Figures 11A, 11B, 11C:
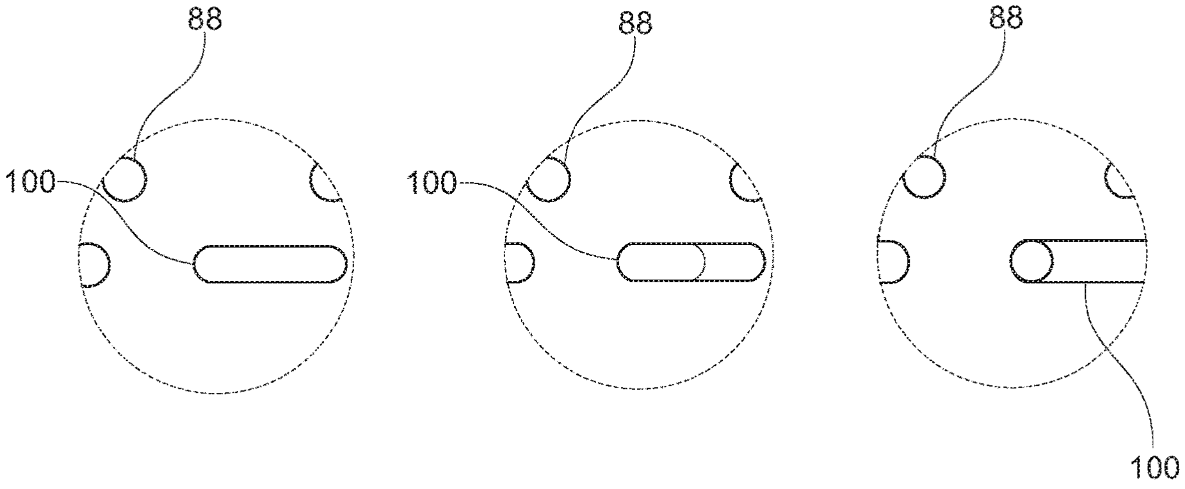
FIG. 11*a* is a zoomed-in view of apertures in the upper shell portion of FIG. 10 wherein a mechanism to adjust the size of orifices in certain adjustable apertures is in a first position.
FIG. 11*b* is a zoomed-in view of apertures in the upper shell portion of FIG. 10 wherein a mechanism to adjust the size of orifices in certain adjustable apertures is in a second position.
FIG. 11*c* is a zoomed-in view of apertures in the upper shell portion of FIG. 10 wherein a mechanism to adjust the size of orifices in certain adjustable apertures is in a third position.

FIG. 11*a* shows a zoomed-in view of adjustable apertures 100 when ring 102 is in a first position. In this first position, the apertures in ring 102 fully overlap adjustable apertures 100 in upper shell portion 30. When ring 102 is in this position, the size of the orifices created by each adjustable apertures 100 will be maximum. This will allow more ambient air to flow from the exterior of oviform shell 20 into cavity 26 in upper shell portion 30 via adjustable apertures 100.

FIG. 11*b* shows a zoomed-in view of adjustable apertures 100 when ring 102 is in a second position. In this second position, the apertures in ring 102 overlap adjustable apertures 100 in upper shell portion 30 by about half, or about half way. When ring 102 is in this position, the size of the orifices created by each adjustable apertures 100 will be about fifty percent of the maximum. This will allow only about half the maximum amount of maximum ambient air that can flow through adjustable apertures 100 to flow from the exterior of oviform shell 20 into cavity 26 in upper shell portion 30 via adjustable apertures 100.

FIG. 11*c* shows a zoomed-in view of adjustable apertures 100 when ring 102 is in a third position. In this third position, the apertures in ring 102 overlap adjustable apertures 100 in upper shell portion 30 by only a small fraction. When ring 102 is in this position, the size of the orifices created by each adjustable apertures 100 will only be a small size. This will allow only a small fraction of the maximum amount of ambient air that can flow through adjustable apertures 100 to flow from the exterior of oviform shell 20 into cavity 26 in upper shell portion 30 via adjustable apertures 100.

Accordingly, a user can selectively rotate ring 102 with respect to upper shell portion 30 to adjust the amount of ambient air, or room temperature air, that enters cavity 26 and is mixed with hot air in camera 60.

In one embodiment, ring 102 rotates with respect to upper shell portion in a smooth motion with an infinite range of orifice settings. In another embodiment, ring 102 rotates with respect to upper shell portion 30 in a predetermined number of preset settings, wherein a user may click from one orifice setting to the next. In another embodiment, adjustable apertures 100 have a minimum orifice size whereby a user may not rotate ring 102 any further to decrease the size of the orifices. In this embodiment, a certain predetermined minimum amount of ambient air is delivered to camera 60 via adjustable apertures 100.

The size of adjustable apertures 100, the number of adjustable apertures 100, a minimum orifice size, and the like, may vary from one embodiment to the other. All such variations are anticipated, and are included within the spirit and scope of the present invention.

This mixed temperature air exits camera 60 through openings 44 at its lower end and passes through one or more cartridges 90 that contain smoking material. The mixed temperature air heats the smoking material in cartridges 90, which releases the aromas and flavors of the smoking material. This aromatic and flavored air then exits oviform shell 20 through a lower end 92 of lower shell portion 40. This air may then pass through an internal plumbing route such as a pipe 94, and water 96, before passing through hose 84 and being inhaled by a user.

In one embodiment of the present invention, some parts of the smoking device are chemically oxidized or coated with a ceramic material. In such embodiment, one or more of the parts that are exposed to heat, heated air, or hot airflow, such as a heating element or compound member 54, are chemically oxidized or coated with a ceramic material. This can be accomplished, for example, by immersing the respective part in protective ceramic material and creating an oxide film thereon by an electro-chemical process. Such apparatus structure will tend to help protect the respective part, such as a heating element or compound member 54, from damage in its environment of high airflow traffic, especially with the cumulative effects of high airflow traffic over time. This will provide the respective part a longer lifespan of reliable performance. Additionally, preventing damage to the respective part during operation of the corresponding smoking device will help prevent the introduction of foreign undesirable flavors into the air or smoke that is inhaled by the user.

Although the devices, systems, apparatus and methods have been described and illustrated above for certain embodiments, variations and modifications will be evident to those skilled in the art. Such variations and modifications may be made without departing from the spirit and scope of the present disclosure, and are therefore anticipated. The description and teachings herein are thus not to be limited to the precise details of methodology or construction set forth herein because variations and modifications are intended to be within the spirit and scope of the present invention.

I claim:

1. A smoking device, comprising:
- a shell, said shell having:
  - an outer surface, and
  - a shell cavity inside said outer surface;
- a channel in said shell cavity, said channel having:
  - a peripheral wall defining a periphery of said channel,
  - a first end,
  - a second end,
  - a channel cavity inside said peripheral wall, first end, and second end of said channel, wherein said first end and second end of the channel are substantially open, and
- a compound member in the channel cavity in said channel, said compound member capable of generating heat in the presence of an electromagnetic field;
- an electrically conductive winding implemented around said compound member;
- wherein:
  - said first end of the channel meets said outer surface of said shell, said shell has an opening in its outer surface corresponding to said open first end of the channel,
  - said electrically conductive winding is electrically connected to a source of electrical power, and
  - said peripheral wall of said channel is made of a ceramic material.

2. The smoking device of claim 1, wherein: said compound member is made of graphite.

3. The smoking device of claim 1, wherein: said compound member includes at least one hole that runs through the entire compound member.

4. The smoking device of claim 3, wherein: said compound member includes a groove on an exterior surface of said compound member.

5. The smoking device of claim 4, wherein said compound member is cylindrical in shape, and said groove runs circularly around a periphery of said compound member.

6. The smoking device of claim 4, further comprising an electronic control module to control a frequency and an amount of electric current flowing through the electrically conductive winding, and the frequency of the electric current is 60 KHz.

7. The smoking device of claim 1, wherein:
- said open second end of said channel is in close proximity to a chamber in said shell cavity,
- said chamber has a peripheral wall, a first end, a second end and a chamber cavity inside said peripheral wall, first end and second end, and
- said first end of said chamber has openings therein.

8. The smoking device of claim 7, wherein said shell has a plurality of apertures in its outer surface, wherein ambient air may enter through said apertures and reach said chamber.

9. The smoking device of claim 8, wherein:
- said shell has an ovoid shape,
- said shell has a plurality of apertures in its outer surface, and
- at least one of said apertures is adjustable, wherein
- ambient air may enter through said at least one adjustable aperture and reach said chamber, wherein:
  - a mechanism is associated with said at least one adjustable aperture;
  - said at least one adjustable aperture defines an orifice with a size, and
  - said size of the orifice of said at least one adjustable aperture is selectively adjustable by adjusting said mechanism associated with said at least one adjustable aperture.

10. The smoking device of claim 1, further comprising:
- a second channel in said shell cavity in said shell, wherein said second channel has:
  - a second peripheral wall defining a periphery of said second channel,
  - a second first end,
  - a second second end,
  - a second cavity inside said second peripheral wall, second first end, and second second end, wherein said second first end and said second second end of the second channel are substantially open.

11. The smoking device of claim 10, further comprising:
- a second compound member in said second cavity in said second channel, said second compound member capable of generating heat in the presence of an electromagnetic field;
- a second electrically conductive winding implemented around said second compound member;
- wherein:
  - said second first end of said second channel meets said outer surface of said shell,
  - said shell has an opening in its outer surface corresponding to said second top of said second channel,
  - said second electrically conductive winding is electrically connected to a source of electrical power, and
  - said second peripheral wall of said second channel is made of a ceramic material.

12. A method of smoking, comprising:
- causing air to flow through a channel inside a shell,
  - said shell having:
    - an outer surface, and
    - a shell cavity inside said shell; and
    - said channel located in said cavity in said shell, said channel having:
    - a peripheral wall, said peripheral wall made of a ceramic material,
    - a first end,
    - a second end,
    - a channel cavity inside said peripheral wall, first end, and second end of said channel, wherein
      - said first end and said second end of the channel are substantially open;
      - heating said air flowing through said channel by passing an electrical current through an electrically conductive winding implemented around a compound member in said cavity in said channel, wherein:
      - said compound member is capable of generating heat in the presence of an electromagnetic field, said first end of the channel meets said outer surface of said shell, and said shell has an opening in its outer surface corresponding to said first end of the channel.

13. The method of claim 12, wherein said compound member is made of graphite.

14. The method of claim 12, further comprising:

causing air to flow through a second channel inside said shell, said second channel located in said cavity in said shell, said second channel having:

a second peripheral wall, said second peripheral wall made of a ceramic material, a second first end, a second second end, a second cavity inside said second peripheral wall, second first end, and second second end of said second channel, wherein said second first end and said second second end of the second channel are substantially open;

heating said air flowing through said second channel by passing an electrical current through a second electrically conductive winding implemented around a second compound member in said second cavity in said second channel, wherein:

said second compound member is capable of generating heat in the presence of an electromagnetic field, said second first end of the second channel meets said outer surface of said shell, and said shell has an opening in its outer surface corresponding to said second first end of the second channel.

15. The method of claim 12, further comprising:

causing said heated air flowing through said channel to flow out of said second end of said channel into a chamber, said chamber having a peripheral wall, a first end, a second end and a cavity inside said peripheral wall, first end and second end, and said first end of said chamber and said second end of said chamber having openings therein; and causing said heated air to flow out of said chamber from said second end of said chamber.

16. The method of claim 15, further comprising mixing said heated air with ambient air in said chamber.

17. The method of claim 16, wherein said shell has an outer surface, said ambient air reaches said chamber via apertures in said outer surface of said shell, and at least one of said apertures has an orifice with a size that is adjustable.

18. A hookah, comprising:

a shell, said shell having a substantially ovoid shape, said shell comprising an upper shell portion and a lower shell portion, said upper shell portion and said lower shell portion separable from each other;

said upper shell portion having a first outer shell with a first cavity inside said first outer shell;

said lower shell portion having a second outer shell with a second cavity inside said second outer shell;

a first channel inside said first cavity, said first channel having a first peripheral wall, an open first end, and an open second end, wherein said first peripheral wall, open first end and open second end define a first channel cavity;

a first compound member in said first channel cavity, said first compound member capable of generating heat in the presence of an electromagnetic field; and a first electrically conductive winding implemented around said first compound member, said first electrically conductive winding connected to an electrical power source;

wherein said open first end of said first channel is flush with said first outer shell, and said first outer shell has an opening corresponding to said open first end of said first channel, said first compound member has an exterior surface that substantially conforms to said first peripheral wall of said first channel, at least one hole running through a first end of said first compound member to a second end of said first compound member, and at least one groove defined by said first compound member.

19. The hookah of claim 18, further comprising:

a second channel inside said first cavity, said second channel having a second peripheral wall, an open first end, and an open second end, wherein said second peripheral wall, open first end and open second end of said second channel define a second channel cavity;

a second compound member in said second channel cavity, said second compound member capable of generating heat in the presence of an electromagnetic field; and a second electrically conductive winding implemented around said second compound member, said second electrically conductive winding connected to an electrical power source; wherein said open top end of said second channel is flush with said first outer shell, and said first outer shell has an opening corresponding to said open first end of said second channel, said second compound member has an exterior surface that substantially conforms to said second peripheral wall of said second channel, at least one hole running through a first end of said second compound member to a second end of said second compound member, and at least one groove defined by second compound member.

20. The hookah of claim 19, further comprising:

a chamber in said first cavity inside said first outer shell, said chamber having a first end, a second end, and a wall, wherein said first end and second end of said chamber comprise openings, and said second end of said first channel and said second end of said second channel are in close proximity with said first end of said chamber; and said first compound member is made of graphite, said second compound member is made of graphite, said first peripheral wall is made of a ceramic material, said second peripheral wall is made of a ceramic material, and said upper shell portion and said lower shell portion can cooperatively engage and disengage with each other.

* * * * *